(12) United States Patent
Jain et al.

(10) Patent No.: US 9,386,486 B2
(45) Date of Patent: *Jul. 5, 2016

(54) MACHINE TYPE COMMUNICATION MONITORING FRAMEWORK FOR 3GPP SYSTEMS

(71) Applicant: Intel Corporation, Santa Clara, CA (US)

(72) Inventors: Puneet K. Jain, Hillsboro, OR (US); Varun N. Rao, San Diego, CA (US); Muthaiah Venkatachalam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,155

(22) Filed: Apr. 10, 2015

(65) Prior Publication Data

US 2015/0215801 A1 Jul. 30, 2015

Related U.S. Application Data

(63) Continuation of application No. 13/928,628, filed on Jun. 27, 2013, now Pat. No. 9,025,445.

(60) Provisional application No. 61/707,784, filed on Sep. 28, 2012.

(51) Int. Cl.
*H04L 1/00* (2006.01)
*G06F 11/00* (2006.01)
(Continued)

(52) U.S. Cl.
CPC ......... *H04W 36/0061* (2013.01); *H04B 17/318* (2015.01); *H04L 1/1812* (2013.01);
(Continued)

(58) Field of Classification Search
CPC ..... H04W 24/08; H04W 24/10; H04W 28/08; H04W 36/08; H04W 36/22; H04W 40/246; H04W 48/14; H04W 48/16; H04W 48/20; H04W 52/0212; H04W 52/0261; H04W 72/02; H04W 72/042; H04W 72/0406; H04W 72/0486; H04W 76/025; H04W 48/18; H04W 4/005; H04W 8/08; H04W 12/06; H04W 36/0061; H04W 72/044; H04W 72/1284; H04W 74/004; H04W 72/0413; H04W 88/02; H04W 74/002; H04W 36/0088; H04W 76/043; H04J 3/1694; H04L 5/0073; H04L 65/60; H04L 65/602; H04L 67/10; H04L 1/1812; H04L 5/0035; H04L 5/0055; H04L 12/12; H04L 12/24; H04L 41/06; H04B 5/00; H04B 17/318; Y02B 60/50
USPC ......... 370/229–238, 252, 254–258, 310–350, 370/400–408, 437–439; 455/431–466
See application file for complete search history.

(56) References Cited

U.S. PATENT DOCUMENTS 8,422,430 B2 * 4/2013 Shi .......................... H04W 8/04
370/328
8,438,278 B2 * 5/2013 Liao ............................ 709/224
(Continued)

FOREIGN PATENT DOCUMENTS

KR 102011008175 7/2011
KR 1020120070438 6/2012
(Continued)

OTHER PUBLICATIONS

3GPP TS 29.368, "Technical Specification Group Core Network and Terminals; Tsp interface protocol between the MTC Interworking Function (MTC-IWF) and Service Capability Server (SCS) Release 11", V2.0.0, Sep. 2012, 24 pages.
(Continued)

*Primary Examiner* — Tri H Phan
(74) *Attorney, Agent, or Firm* — Stoel Rives LLP

(57) ABSTRACT

A 3GPP monitoring architecture framework provides monitoring event configuration, detection, and reporting for machine-type and other mobile data applications using a machine type communication interworking function (MTC-IWF) that communicates monitoring event configuration, detection, and reporting messages through existing interfaces, such as Tsp, T4, and T5 interfaces.

9 Claims, 9 Drawing Sheets

(51) Int. Cl.

| | |
|---|---|
| *H04L 12/28* | (2006.01) |
| *H04W 4/00* | (2009.01) |
| *H04W 36/00* | (2009.01) |
| *H04W 72/04* | (2009.01) |
| *H04W 72/12* | (2009.01) |
| *H04W 74/00* | (2009.01) |
| *H04L 5/00* | (2006.01) |
| *H04W 48/14* | (2009.01) |
| *H04W 72/02* | (2009.01) |
| *H04W 76/02* | (2009.01) |
| *H04W 88/02* | (2009.01) |
| *H04L 1/18* | (2006.01) |
| *H04B 17/318* | (2015.01) |
| *H04W 24/10* | (2009.01) |
| *H04W 76/04* | (2009.01) |
| *H04W 36/08* | (2009.01) |
| *H04W 48/18* | (2009.01) |

(52) U.S. Cl.
CPC ............ *H04L5/0035* (2013.01); *H04L 5/0055* (2013.01); *H04W 24/10* (2013.01); *H04W 36/0088* (2013.01); *H04W 48/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/1284* (2013.01); *H04W 74/002* (2013.01); *H04W 74/004* (2013.01); *H04W 76/025* (2013.01); *H04W 76/043* (2013.01); *H04W 88/02* (2013.01); *H04W 36/08* (2013.01); *H04W 48/18* (2013.01)

(56) References Cited

U.S. PATENT DOCUMENTS

| | | | | |
|---|---|---|---|---|
| 8,743,682 | B2* | 6/2014 | Lee | .................... H04W 74/004 370/229 |
| 8,989,729 | B2* | 3/2015 | Barclay | ................. H04W 24/08 375/230 |
| 9,025,445 | B2* | 5/2015 | Jain et al. | ...................... 370/229 |
| 9,125,003 | B2* | 9/2015 | Ma | ........................ H04W 4/005 |
| 2011/0270973 | A1 | 11/2011 | Liao | |
| 2011/0280155 | A1 | 11/2011 | Shi | |
| 2012/0157050 | A1* | 6/2012 | Kang | ..................... H04W 12/06 455/411 |
| 2012/0252481 | A1 | 10/2012 | Anpat et al. | |
| 2012/0264451 | A1* | 10/2012 | Kim | ........................ H04L 41/06 455/456.1 |
| 2012/0281580 | A1 | 11/2012 | Lee | |
| 2013/0042011 | A1* | 2/2013 | Sugizaki et al. | ............... 709/227 |
| 2013/0095837 | A1* | 4/2013 | Zhou | ..................... H04W 64/00 455/440 |
| 2013/0128777 | A1* | 5/2013 | Garcia Azorero | ............ 370/259 |
| 2014/0045452 | A1* | 2/2014 | Ma | ........................ H04W 4/005 455/406 |
| 2014/0050084 | A1 | 2/2014 | Cheng et al. | |
| 2014/0086214 | A1 | 3/2014 | Hong et al. | |
| 2014/0092808 | A1* | 4/2014 | Jain | ....................... H04L 5/0055 370/328 |
| 2014/0134996 | A1* | 5/2014 | Barclay | ................. H04W 24/08 455/422.1 |
| 2014/0307632 | A1 | 10/2014 | Kim et al. | |
| 2015/0103684 | A1* | 4/2015 | Xu | ........................ H04W 4/005 370/252 |
| 2015/0249900 | A1* | 9/2015 | Kim | ..................... H04W 24/10 370/252 |

FOREIGN PATENT DOCUMENTS

| | | |
|---|---|---|
| WO | 2011084011 A2 | 7/2011 |
| WO | 2011089464 A1 | 7/2011 |
| WO | 2013070051 A1 | 5/2013 |

OTHER PUBLICATIONS

PCT/US2013/061569, International Search Report and Written Opinion, Jan. 2, 2014, 9 pages.

\* cited by examiner

MACHINE TYPE COMMUNICATION MONITORING FRAMEWORK FOR 3GPP SYSTEMS

RELATED APPLICATIONS

This application is a continuation of U.S. patent application Ser. No. 13/928,628, filed Jun. 27, 2013; and claims priority benefit of U.S. Provisional patent application No. 61/707,784, filed Sep. 28, 2012. Both aforementioned applications are hereby incorporated herein by reference in their entireties.

TECHNICAL FIELD

The present disclosure generally relates to monitoring of configured events (so-called, monitoring events) as a service for machine-type communication (MTC), and, more particularly, to third-generation partnership project (3GPP) architectures and messages supporting MTC monitoring (or simply, monitoring) event configuration, detection, and reporting.

BACKGROUND INFORMATION

3GPP Technical Specification 22.368, titled, "Service requirements for Machine-Type Communication (MTC); Stage 1 (Release 11)," and 3GPP Technical Report 37.868, titled, "Study on RAN Improvements for Machine-Type Communications (Release 10)," describe several use cases for MTC monitoring. For example, user equipment (UE) metering devices could monitor municipal utility service usage to periodically report information on energy consumption to service providers. Metering devices may autonomously push reports of usage information to a centralized node in a network, or the centralized node may poll metering devices as reporting information is needed.

Road security is another example application of monitoring. For instance, in the event of a car accident, an in-vehicle emergency call service would autonomously report location information of the car accident to an emergency first responder and thereby facilitate prompt assistance. Other road-security applications for monitoring include intelligent traffic management, automatic ticketing, fleet management, and other uses.

Consumer electronics, including devices such as eBook readers, digital cameras, personal computers, and navigation systems, could also benefit from monitoring. For example, such devices could use monitoring to upgrade firmware or to upload and download online content.

BRIEF DESCRIPTION OF THE EMBODIMENTS

FIG. 3 is a flowchart showing an MTC-IWF behavior in response to receiving configuration request from a SCS/AS.

DETAILED DESCRIPTION OF EMBODIMENTS

Monitoring, in the context of a 3GPP system, may be used to dynamically reallocate network resources in response to a monitoring event. Examples of events to be monitored include the association of an MTC device and a Universal Integrated Circuit Card, or vandalism or theft of a communication module in an MTC device. If such an event were detected by a node in a network for the device, the network or device could be configured to perform special actions, e.g., limit access or reduce allocated resources of the network or device. Accordingly, this application describes techniques to activate monitoring for specific events, event detection, and reporting of event information (e.g., location information) to various authorized users or entities for response by applications or for logging the event with various nodes, for example.

3GPP messages for dynamic monitoring event configuration, detection, and reporting are described. Also described is a 3GPP network system architecture (or simply, a 3GPP system) including an MTC interworking function (MTC-IWF) communicating monitoring event configuration, detection, and reporting messages through existing interfaces, such as Tsp, T4, and T5 interfaces.

An MTC-IWF configures network elements for monitoring specific events requested by a services capability server (SCS) or an application server (AS), collectively or alternatively referred to as SCS/AS. The SCS/AS submits a configuration request to the MTC-IWF over a Tsp interface to dynamically configure various network elements (also called nodes or entities) for monitoring. In some embodiments, the MTC-IWF sends, over an existing reference point (e.g., T4/T5 interfaces), monitoring event details such as event-ID, event-action, and event-monitoring attribute value pairs (AVPs) defining an event and a corresponding action to be taken in response to an occurrence of the event. After a network element is configured for monitoring an event, the SCS/AS may receive an acknowledgement of the same.

According to some embodiments, in response to an occurrence of a configured event, an MTC-IWF is informed of the occurrence and a predefined action is taken. For example, the MTC-IWF reports the event to the SCS/AS.

Figure 1:
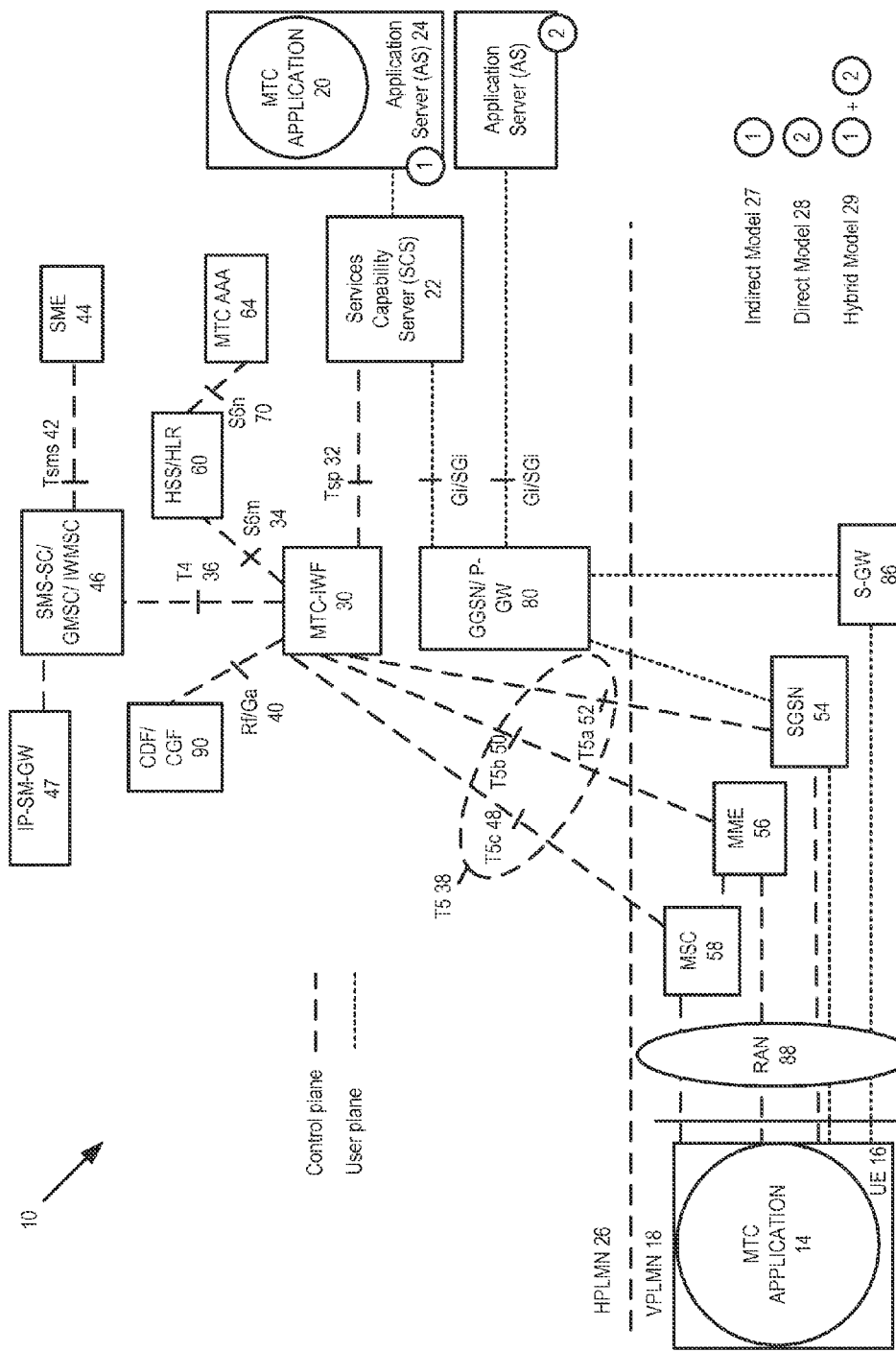
FIG. 1 is a block diagram of a 3GPP system for monitoring as an MTC service, according to one embodiment.

FIG. 1 shows an example 3GPP system 10 supporting monitoring event configuration, detection, and reporting associated with MTC devices. The 3GPP system 10 provides Um/Uu/LTE-Uu interfaces 12 connecting an MTC application 14 of a UE 16 in a visited public land mobile network (VPLMN) 18 to an MTC application 20 of an SCS 22 or AS 24 in a home public land mobile network (HPLMN) 26. The UE 16 hosts one or multiple MTC applications 14. Likewise, the AS 24 hosts one or multiple MTC applications 20 that make use of the SCS 22 for additional value-added services. Further details of the 3GPP system 10 and its network nodes (also called entities or elements) are available in 3GPP Technical Specification 23.682, titled, "Architecture enhancements to facilitate communication with packed data networks and applications (Release 11)" (referred to herein as TS 23.682), which is summarized in the following paragraphs.

The 3GPP system 10 supports various MTC communication models between the UE 16 and the SCS/AS 22, 24 for providing services used for end-to-end communications between the MTC applications 14 and 20. For example, TS 23.682 Annex A, subtitled "MTC Deployment Scenarios" describes three different communication models including indirect, direct, and hybrid communication models 27, 28, and 29. Additional information describing these models is available in TS 23.682.

The 3GPP system 10 provides transport, subscriber management, and other communication services including various architectural enhancements motivated by, but not restricted to, MTC. For example, one such service is control plane device triggering—so-called device triggering. Device triggering is a technique to send information to the UE 16 to trigger it to perform application specific actions including initiating communications with the SCS 22 (in the indirect communication model 27) or the AS 24 (in the direct communication model 28). Device triggering may be employed when an IP address for the UE 16 is not available or reachable by the SCS/AS 22, 24. Thus, a device trigger message includes information that allows the 3GPP system 10 to route messages to an appropriate UE application and allows that UE to route messages to an appropriate SCS/AS application.

The operator of the HPLMN 26 or an MTC service provider typically controls the SCS 22. The SCS 22 offers capabilities for use by one or multiple ASs. The SCS 22 is the entity that connects one or more ASs to the 3GPP system 10 to enable them to communicate through specific 3GPP defined services with the UE 16 and with a MTC-IWF 30. An SCS may be connected to one or more MTC-IWFs. Likewise, an MTC-IWF can be connected to one or more SCSs.

The MTC-IWF 30 could be a standalone entity or a functional entity of another network element in the HPLMN 26. The MTC-IWF 30 terminates a Tsp interface 32, an S6m interface 34, a T4 interface 36, a T5 interfaces 38, and an Rf/Ga interface 40 (each of which is described below); hides internal topology of the HPLMN 26; and relays or translates information sent over the Tsp interface 32 to invoke specific functionality provided by entities of the HPLMN 26.

Interfaces between network nodes of the 3GPP system 10 are described in TS 23.682. These inferfaces and nodes are summarized as follows.

A Tsms interface 42 is a reference point used by a short message entity (SME) 44 to communicate via a short message service (SMS) with UEs used for MTC. The Tsms interface 42 is also the interface used to send a trigger message to the UE 16 by any network entity (e.g., the SCS 22) acting as the short message entity 44, or other entities outside the 3GPP system 10 communicating with UEs via a short message service (SMS).

The T4 interface 36 is a reference point used by the MTC-IWF 30 to route device triggers to a short message service—service center (SMS-SC), gateway mobile switching center (GMSC), or interworking mobile switching center (IWMSC) 46 in the HPLMN 26. The SMS-SC/GMSC/IWMSC 46 communicates with an IP short message gateway (IP-SM-GW) 47. Additional details of the IP-SM-GW 47 are available in section 5.3.1 of 3GPP Technical Specification 23.204, titled, "Support of Short Message Service (SMS) over generic 3GPP Internet Protocol (IP) access; Stage 2 (Release 12)."

The Tsp interface 32 is a reference point used by the SCS 22 to communicate with the MTC-IWF 30 relevant control plane signalling. In other words, the Tsp interface 32 is a 3GPP standardized interface to facilitate value-added services motivated by MTC (e.g., control plan device triggering) and provided by the SCS 22.

T5a, T5b, and T5c interfaces 48, 50, and 52 (generally, the T5 interfaces 38) are reference points used between the MTC-IWF 30 and a serving general packet radio service (GPRS) node (SGSN) 54, an MME 56, and a mobile switching center (MSC) 58, respectively. To support monitoring in roaming scenarios, roaming agreements may be made between the HPLMN 26 and VPLMN 18 operators. In such a roaming scenario, the T5 interfaces 38 would also be configured to support roaming.

The SMS-SC 46 terminates various interfaces that are not shown in FIG. 1. For example, the SMS-SC 46 terminates Gd, SGd, and E interfaces for, respectively, the SGSN 54, the MME 56, and the MSC 58.

The S6m interface 34 is a reference point used by the MTC-IWF 30 to interrogate a home subscriber service (HSS) or a home location register (HLR) 60, collectively or alternatively referred to as HSS/HLR 60. The HSS/HLR 60 are located between the MTC-IWF 30 and an MTC authentication, authorization and accounting entity (MTC AAA) 64 to support device triggering by storing UE network subscription information and providing that information to an interrogating MTC-IWF for use in device triggering. The HSS/HLR 60 also determine whether the SCS 22 is authorized to send a device trigger to the UE 16.

An S6n interface 70 is a reference point used by the MTC-AAA 64 to interrogate the HSS/HLR 60.

The 3GPP system 10 may include additional entities. For example, a gateway GPRS support node (GGSN) or a P-GW 80, collectively or alternatively referred to as GGSN/P-GW 80, support the indirect or hybrid communication models 27 or 29. A serving gateway (S-GW) 86 interfaces with a radio access network 88. A charging data function (CDF) or charging gateway function (CGF) 90 handle billing services.

An MTC monitoring framework for the 3GPP system 10 is described herein according to three complementary components. Section A describes monitoring event configuration using diameter-protocol-based messages and examples of defining monitoring events on various entities of the 3GPP system 10. Section B describes monitoring event detection for configured events. In response to detection of a monitored event, a UE or network entity may execute a pre-configured action, such as event reporting. Section C describes monitoring event reporting, in which the UE or another network entity report the detected event to the SCS/AS 22, 24.

A. Monitoring Event Configuration

Monitoring event configuration data is provided to network entities so that those entities will perform detection and reporting of monitoring events. For example, the configuration data may include monitoring event type, corresponding actions to take for the monitoring event, information identifying an SCS/AS that subscribes to the monitoring event, activation/deactivation information for configured monitoring events, and other monitoring event data. The monitoring event data is provided in messages that are based on a Diameter Base Protocol defined in Internet Engineering Task Force (IETF) Request for Comments (RFC) 3588. A description of diameter-protocol-based messages including monitoring event data is provided in the following section A.1, which is followed by sections A.2-A.5 describing various embodiments employing the messages of section A.1 to establish dynamic monitoring event configuration among various network elements.

A.1 Messaging Framework Facilitating Monitoring Event Configuration

3GPP Technical Specification 29.368, titled, "Tsp interface protocol between the MTC Interworking Function (MTC-IWF) and Service Capability Server (SCS) (Release 11)," (TS 29.368) provides extensions to IETF RFC 3588. For example, TS 29.368 specifies diameter-protocol-based AVPs (i.e., message data fields), protocols, and various command codes tailored for a Tsp reference point in a 3GPP system.

In some embodiments, two messages defined in TS 29.368, device-action-request (DAR) and device-action-answer (DAA) messages (also called commands), are enhanced to respectively communicate monitoring configuration requests and statuses of such request. In other embodiments, monitoring-action-request (MAR) and monitoring-action-answer (MAA) messages are diameter-based-protocol messages used instead of or in addition to the DAR and DAA messages, but having command codes that are different from those of the (enhanced) DAR and DAA messages.

The DAR and DAA messages include an action-type AVP informing the MTC-IWF 30 of which action type is to be requested (e.g., monitoring configuration, report, activate, or deactivate) and also informing the SCS 22 of what action type is to be reported. The action-type AVP has a numeric identifier code and it also includes the following defined values: Device Trigger Request (value 1)—This value indicates a device trigger request and the value is used in a device-action AVP of the DAR message and in a device-notification AVP of the DAA message; Delivery Report (value 2)—This value indicates a delivery report sent from the MTC-IWF 30 to the SCS 22 and the value is used in the device-notification AVP of a device-notification-request command; and Monitoring Action Request (value 3)—This value indicates that a monitoring request is placed and the value is used in the Device-Action AVP of the DAR command.

The DAR message has an AVP for a Monitoring Action Request flag to specify to the MTC-IWF 30 that a particular network element should be configured for monitoring. The DAR message may also include monitoring event data similar to that of the MAR message described in Table 1.

The DAA has an AVP for a Monitoring Configuration Answer flag (or simply, the request status) to reflect the status of a DAR message and thereby communicate a result of the DAR message. The DAA message may also include information similar to that of the MAA message described below.

The MAR message shown in Table 1 has a new AVP for a Monitoring Action Request flag. The MAR message also has new values defined for action-type AVPs. Some of the action-type AVP values include: action-types—configuration, report, activate, and deactivate. New AVPs are also defined for Event ID, Event Action, Destination Node, Event-Specific Information, and Event Frequency, any of which can be configured by the MAR message. The Event ID AVP is used to identify the event to be monitored. The Event Action AVP is used to specify the action to be taken when an event being monitored occurs. The Destination Node AVP is used to specify the network element to be configured to monitor the event. The Event-Specific information AVP is used to specify that particular information related to an event that occurred should to be sent. For example, if an MTC device is used in a car to monitor failure of a certain component, then, when the failure event occurs, a log may be generated containing information about the failure. In this case, the Event-Specific Information AVP indicates whether this information needs to be sent in response to the event occurrence. The Event Frequency AVP is used to specify whether the event has to be monitored continuously or monitored at time intervals.

The following definition of the MAR message is formatted according to a Command Code Format (CCF) definition based on the Diameter Base Protocol defined by IETF RFC 3588 and extended by TS 29.368. Thus, the following example definition is expressed in an Augmented Backus-Naur Form (ABNF) metalanguage syntax:

TABLE 1

| Command Definition | Command AVP Fields < header >, < fixed >, { required }, and [ optional ] | Notes |
|---|---|---|
| <MAR> ::= | < Diameter Header: TDB-IANA, REQ, PXY > | TDB-IANA numeric code identifying the message |
| | < Session-Id > { Auth-Application-Id } { Auth-Session-State } { Origin-Host } { Origin-Realm } { Destination-Realm} [ Destination-Host ] [ Origin-State-Id ] | Similar elements may be found in DAR message |
| | [ Device-Action ] [ Event ID ] [ Event Action ] [ Destination Node ] [ Event-Specific Information ] [ Event Frequency ] | AVP elements for monitoring event data |
| | *[ Proxy-Info ] *[ Route-Record ] *[ AVP ] | *denotes elements that may have duplicate instances |

The MAA message has a new AVP defined for communicating a result of the MAR message (i.e., the request status). The request status informs the SCS/AS 22, 24 whether the specified network element has been successfully configured for monitoring. As explained in subsequent sections, the MTC-IWF 30 sends the status of the configuration request to the SCS 22 by sending a MAA message with the action-type AVP set to the value Monitoring Configuration Action Request and the Request-Status AVP (which is also included in the MAA message—similar to the DAA message) set to a value indicating the status of the device trigger request.

A.2 Monitoring Configuration Using Tsp and T5 Interfaces

Figure 2:
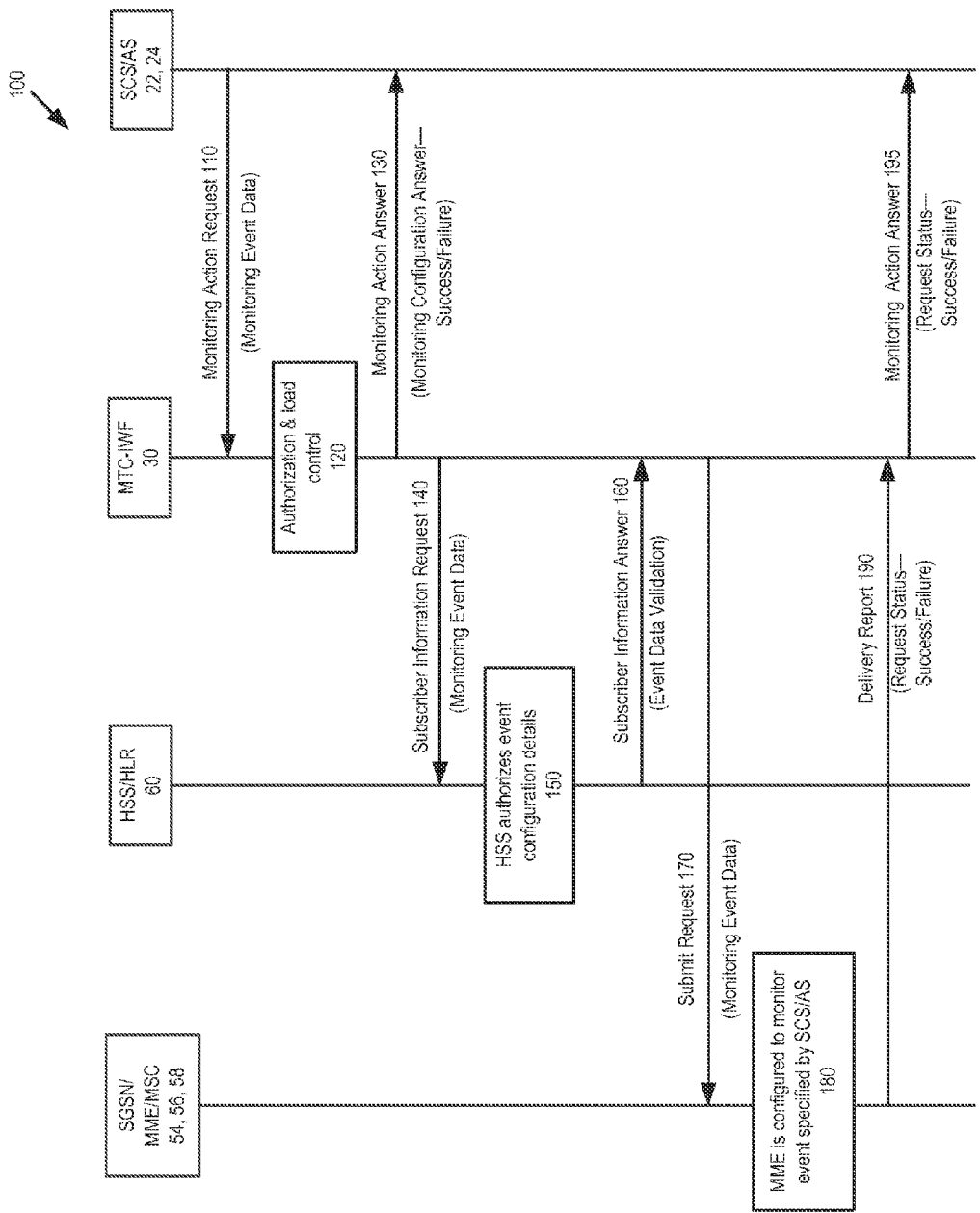
FIG. 2 is a message sequence chart showing message call flow configuring a mobility management entity (MME) for monitoring.
Figure 3:
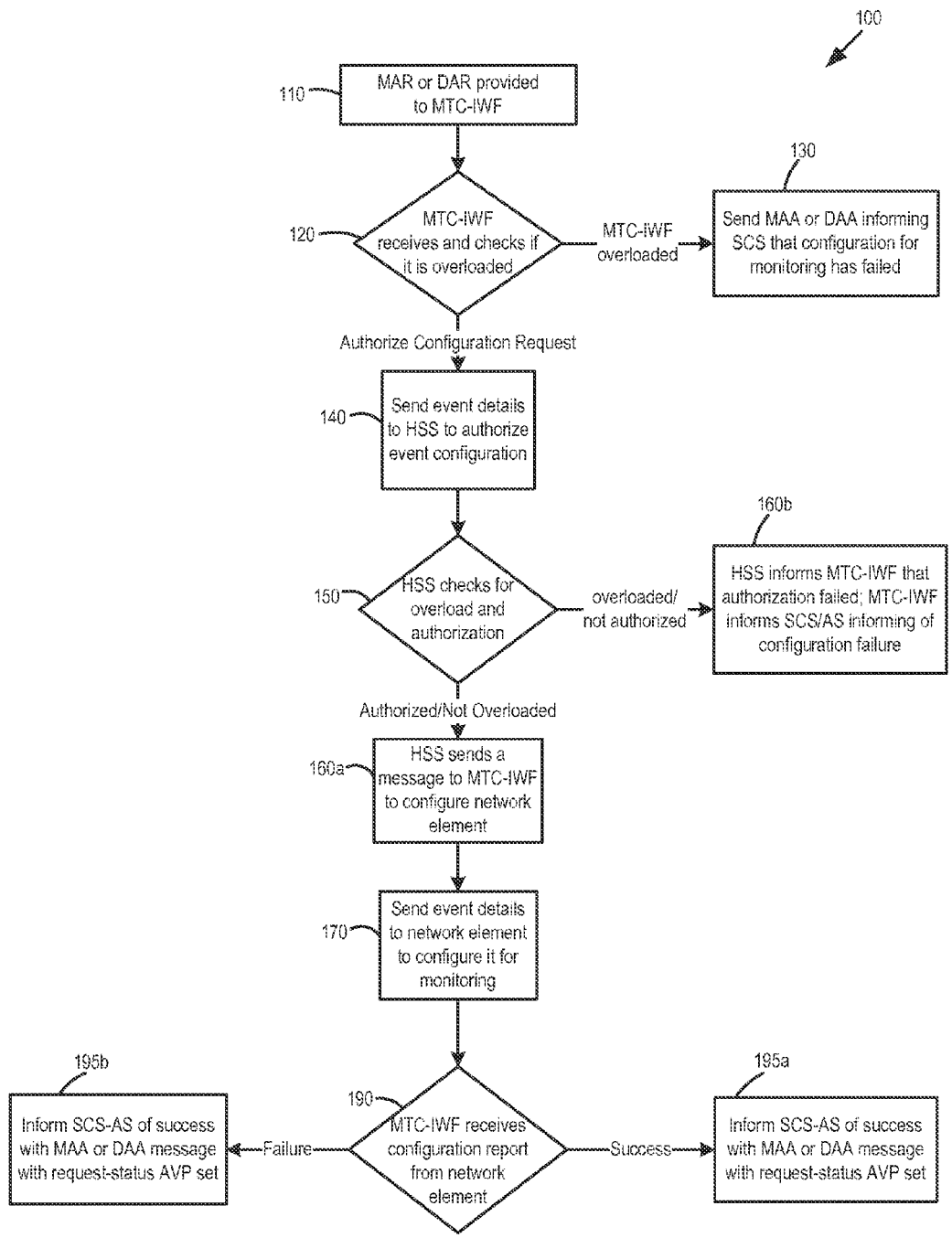

FIGS. 2 and 3 show an example of an MTC monitoring configuration 100 on the SGSN/MME/MSC 54, 56, or 58 using Tsp and T5 interfaces 32 and 38. Steps 110-180 describe a sequence of diameter-protocol-based messages for configuration of the SGSN/MME/MSC 54, 56, 58. Steps 190-195 describe response messages to the configuration. FIG. 3 does omits the behaviour of the configured node (step 180), but otherwise steps common to each of FIGS. 2 and 3 share similar reference numbers.

Step 110: In some embodiments, the SCS/AS 22, 24 provides a MAR message (see Table 1) to the MTC-IWF 30 over the Tsp interface 32. The action-type AVP of the MAR message is set to the value Monitoring Action Request (3) to dynamically configure a network element for monitoring. Monitoring event details are configured by the monitoring event data AVPs (also called monitoring configuration data) and associated parameters shown in Table 1. In other embodiments, the SCS/AS 22, 24 sends an enhanced DAR command to the MTC-IWF 30 with the action-type AVP set to a value for a monitoring configuration request and with other event-related AVPs described previously.

Step 120: In response to receiving the MAR message, the MTC-IWF 30 checks whether the SCS 22 is authorized to send monitoring requests and whether the SCS 22 has exceeded its quota or rate of submitting monitoring requests over the Tsp interface 32.

Step 130: If the check fails, in some embodiments, the MTC-IWF 30 sends a message with a cause value indicating the reason for the failure condition and the flow stops at this step. For example, the MTC-IWF 30 sends the status of the configuration request to the SCS 22 by sending an MAA command with the action-type AVP set to the value monitoring action request (3) and the request-status AVP set to the value indicating the status of the device trigger request (i.e., unsuccessful).

Optionally, if the check succeeds, in some embodiments the MTC-IWF 30 sends a message indicating success and the flow continues with step 140. Other embodiments having successful checks at step 120 simply omit step 130 and continue to the step 140.

Steps 140-160: The MTC-IWF 30 sends a subscriber-information-request message to the HSS/HLR 60 to authorize the monitoring event data and register other configuration details (e.g., confirming an event-ID is available). For example, monitoring events are configured in the HSS 60 as part of UE subscription data so the HSS 60 verifies 150 the monitoring event data and authorizes the MTC-IWF 30 to configure a network element for monitoring. The HSS 60 may also indicate the network node for monitoring the event (i.e., MME, SGSN, P-GW, or other nodes). Accordingly, the HSS 60 responds 160 with subscriber-information-answer message indicating whether the configuration is authorized 160a or not authorized 160b (FIG. 3). The subscriber-information-request and subscriber-information-answer messages are enhanced to carry AVPs relating to monitoring event data.

Step 170: Based on type of event action requested, the MTC-IWF 30 determines the destination node for monitoring configuration based on the information received from the SCS 22 and HSS 60. For example, in case of monitoring event configuration (or activation/deactivation) at the MME 56, the MTC-IWF 30 sends a submit-request message over the T5b interface 50 to the MME 56 with the monitoring event data. The submit-request message is also enhanced to include monitoring event data.

Step 180: The MME 56, on receiving submit-request message, determines that the monitoring event data is intended for it based on the destination-node AVP. It then configures (e.g., activates/deactivates) monitoring as specified by the SCS/AS 22, 24. The MME 56 is then capable of monitoring for the event and responding to the event as specified by the SCS/AS 22, 24.

Steps 190-195: The MME 56 sends a confirmation of success/failure of the monitoring configuration to the MTC-IWF 30. The delivery report message is enhanced along the lines described with respect to the DAR and DAA messages to reflect the request status. The MTC-IWF 30 then sends a report to the SCS/AS 22, 24 of the configuration status by sending, for example, an MAA message. In some embodiments, steps 190-195 are optional. In other embodiments, steps 190-195 are performed only in response to an unsuccessful configuration attempt.

As described, monitoring configuration data is dynamically provided by the SCS 22. In other embodiments, monitoring configuration data is statically stored as part of UE subscription and available from an HSS for download to a SGSN/MME during an attach procedure. In other words, SGSN/MME can receive monitoring configuration data downloaded from an HSS as part of UE subscription download procedure, e.g., during Attach/RAU/TAU procedure.

In some embodiments, the MME 56 may be configured using the T4 interface 36. For example, instead of providing a device trigger message to a UE as described in the following section A.3.2, the MME 56 is provided a device trigger and is thereby configured to monitor an event.

A.3 Monitoring Event Configuration at a UE

This section has two subsections describing UE configuration over T5 and T4 interfaces, respectively.

A.3.1 Configuring UE for Monitoring Using T5 Interface

Figure 4:
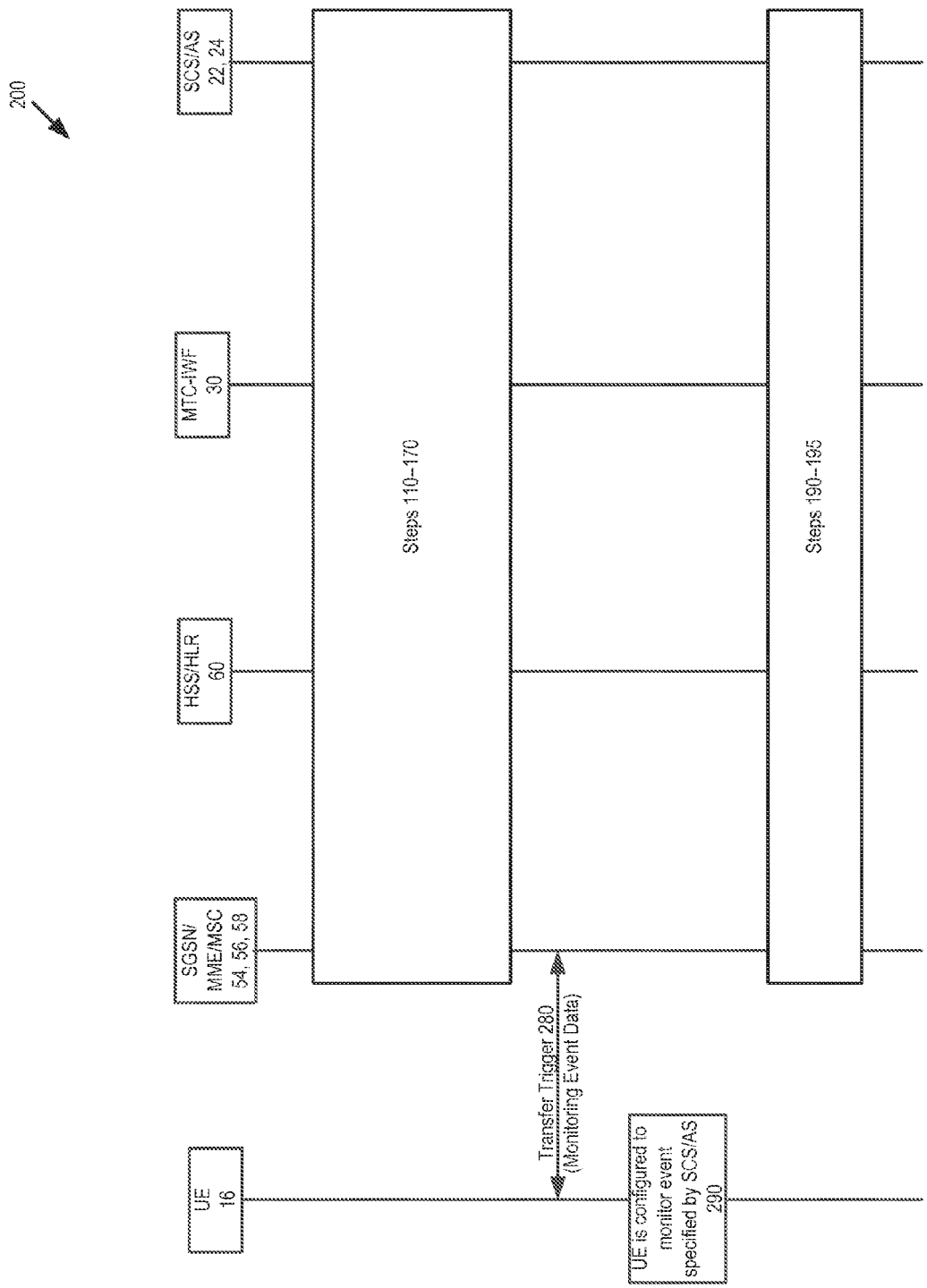
FIG. 4 is a message sequence chart showing message call flow configuring, via a T5 interface, a UE for monitoring.

FIG. 4 shows a message call flow for configuring the UE 16 to monitor events, including previously described steps 110-160 and 190-195 that are common to FIGS. 2-3.

Steps 280-290: The MME 56 (or SGSN/MSC 54, 58 in some other embodiments) transfers a device trigger message to the UE 16 and now the UE 16 is configured with the monitoring details. Step 280 shows a bi-directional arrow showing that the UE 16 may provide a status response indicating whether the UE 16 has been configured, according to some embodiments. As shown in FIG. 4, the transfer at step 280 (and any optional response) is made using a small data procedure over the T5b interface 50. Small data procedures are described in TS 23.682 Annex B, for example. In some embodiments, however, monitoring event data may be provided using a device trigger having a trigger payload, or other IP messaging services. Upon successful delivery, the UE 16 responds to a monitoring event as specified by the SCS 22.

A.3.2 Configuring UE for Monitoring Using T4 Interface

Figure 5:
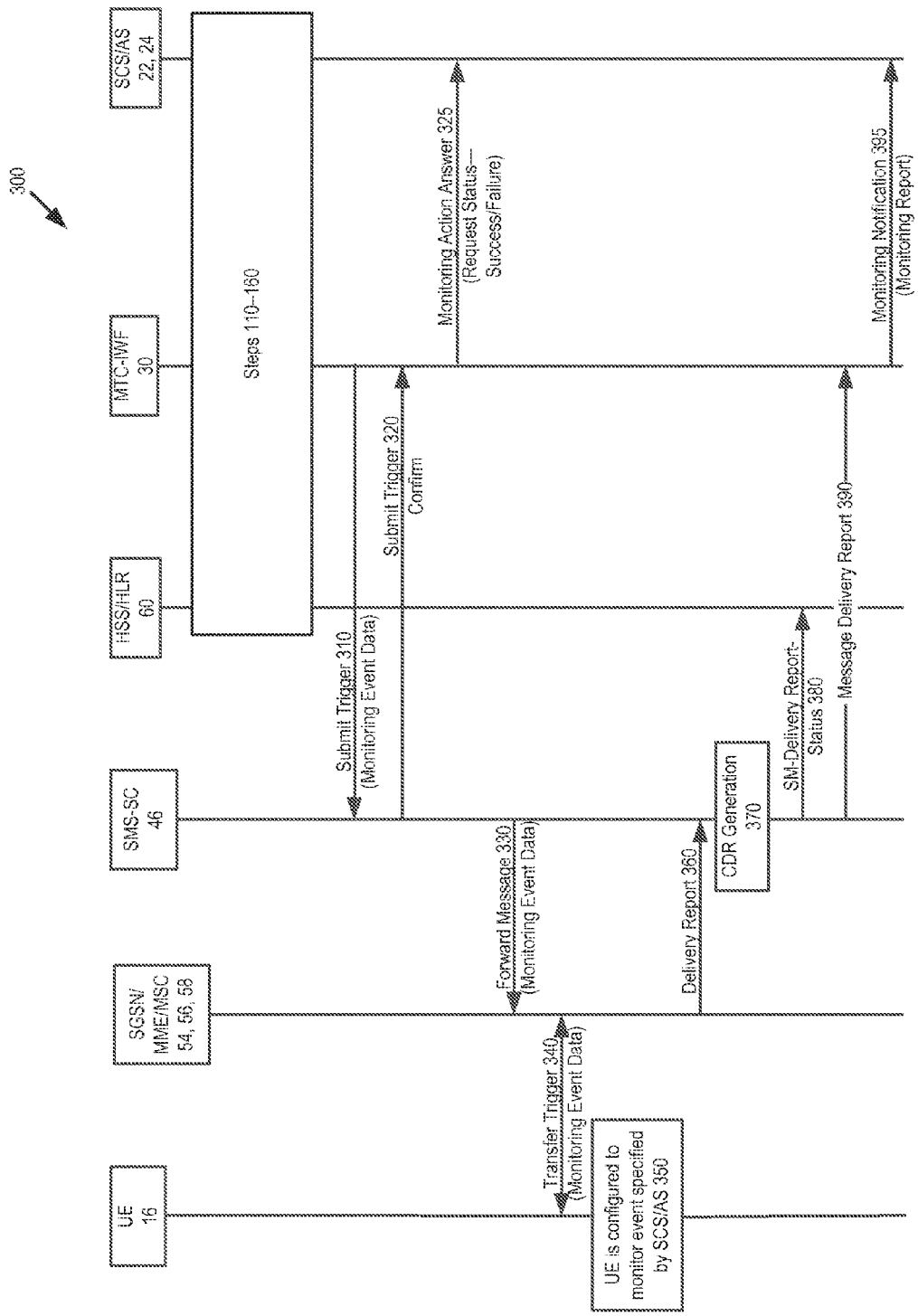
FIG. 5 is a message sequence chart showing message call flow configuring, via a T4 interface, a UE for monitoring.

FIG. 5 shows a message call flow using the T4 interface 36 for configuring the UE 16 to monitor events. FIG. 5 shows previously described steps 110-160 and 195 that are common to FIGS. 2-3.

The steps 310-390 follow the procedure documented in section 5.2.2 of TS 23.682. Notably, however, the submit-trigger message of step 310 and transfer trigger message of step 340 include payloads that are enhanced to carry monitoring event-related information as described previously. Additionally, when step 120 is successful (i.e., when step 130 is omitted) a step 325 may provide the SCS/AS 22, 24 with the results of a monitoring configuration attempt.

Once the trigger is delivered to the UE 16, it is configured to monitor events. The MTC-IWF 30 receives acknowledgement of trigger delivery and notifies the SCS/AS 22, 24 at step 395. Step 395 may also include monitoring event-specific data AVPs to report a monitored event as described below with respect to FIG. 8.

A.4 Configuring P-GW for Monitoring

Figure 6:
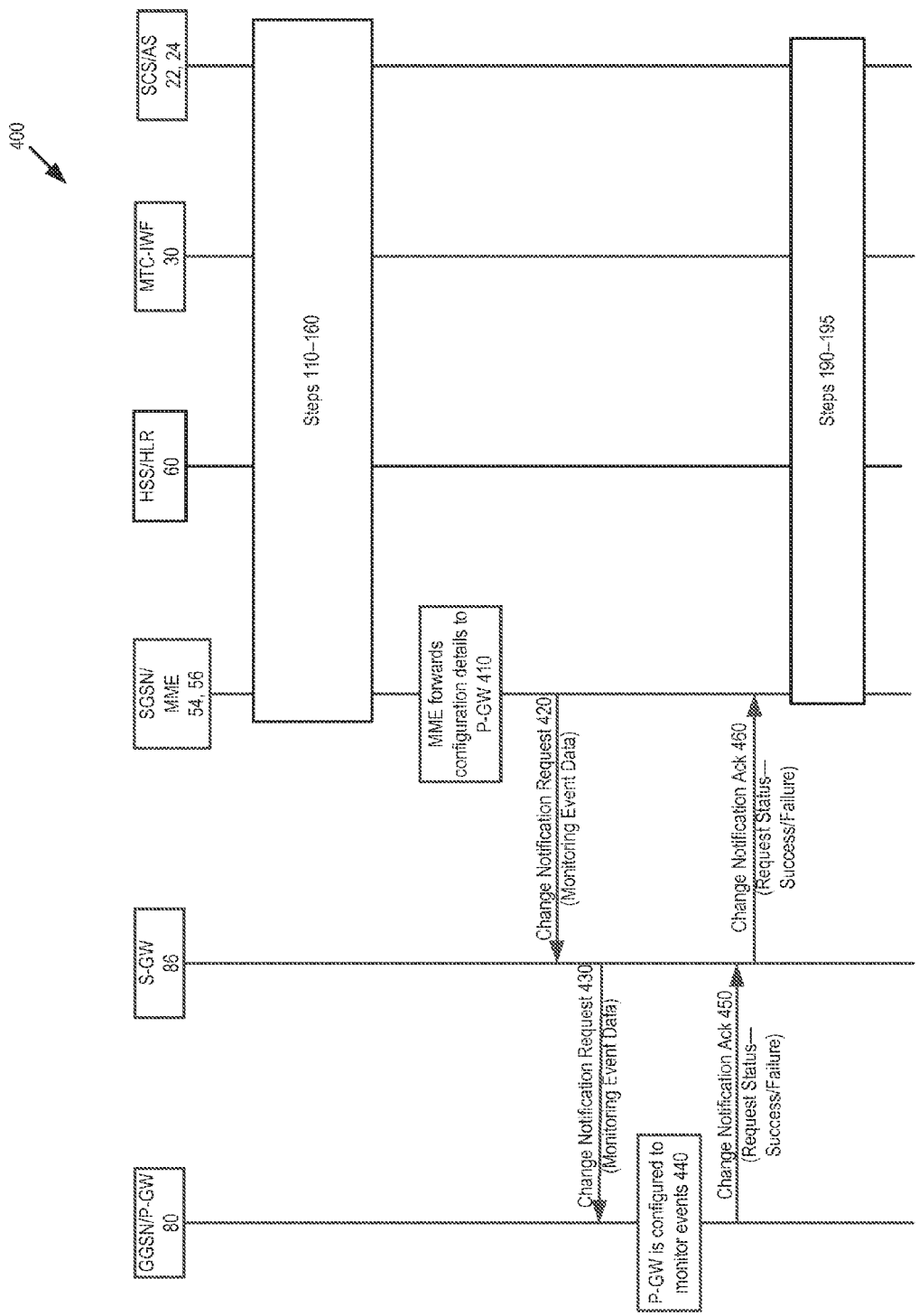
FIG. 6 is a message sequence chart showing message call flow configuring a packet data network gateway (P-GW) for monitoring.

FIG. 6 shows a message call flow 400 using an S5 interface (not shown) or other interface between the P-GW 80 and the S-GW 86 for configuring the P-GW 80 (or the GGSN) to monitor events. FIG. 6 shows previously described steps 110-160 and 190-195 that are common to FIGS. 2-3.

Steps 410-440: The MME 56 uses an enhanced change-notification message to send the monitoring event details to the S-GW 86. The S-GW 86 forwards the message to the P-GW 80 and the P-GW 80 is configured to monitor the event. Enhancements to the change-notification message are similar to those related to Table 1. In other embodiments, IP messaging services, trigger payload services, small data service, or other services may be used to provide the monitoring event data.

Steps 450-460: The Success/Failure of the event configuration is sent in an enhanced Change Notification Acknowledgement message to the MME 56. The MME 56, on receiving the report, initiates step 190. Step 195 is then performed by the MTC-IWF 30 as described previously.

A.5 Configuring eNB for Monitoring

Figure 7:
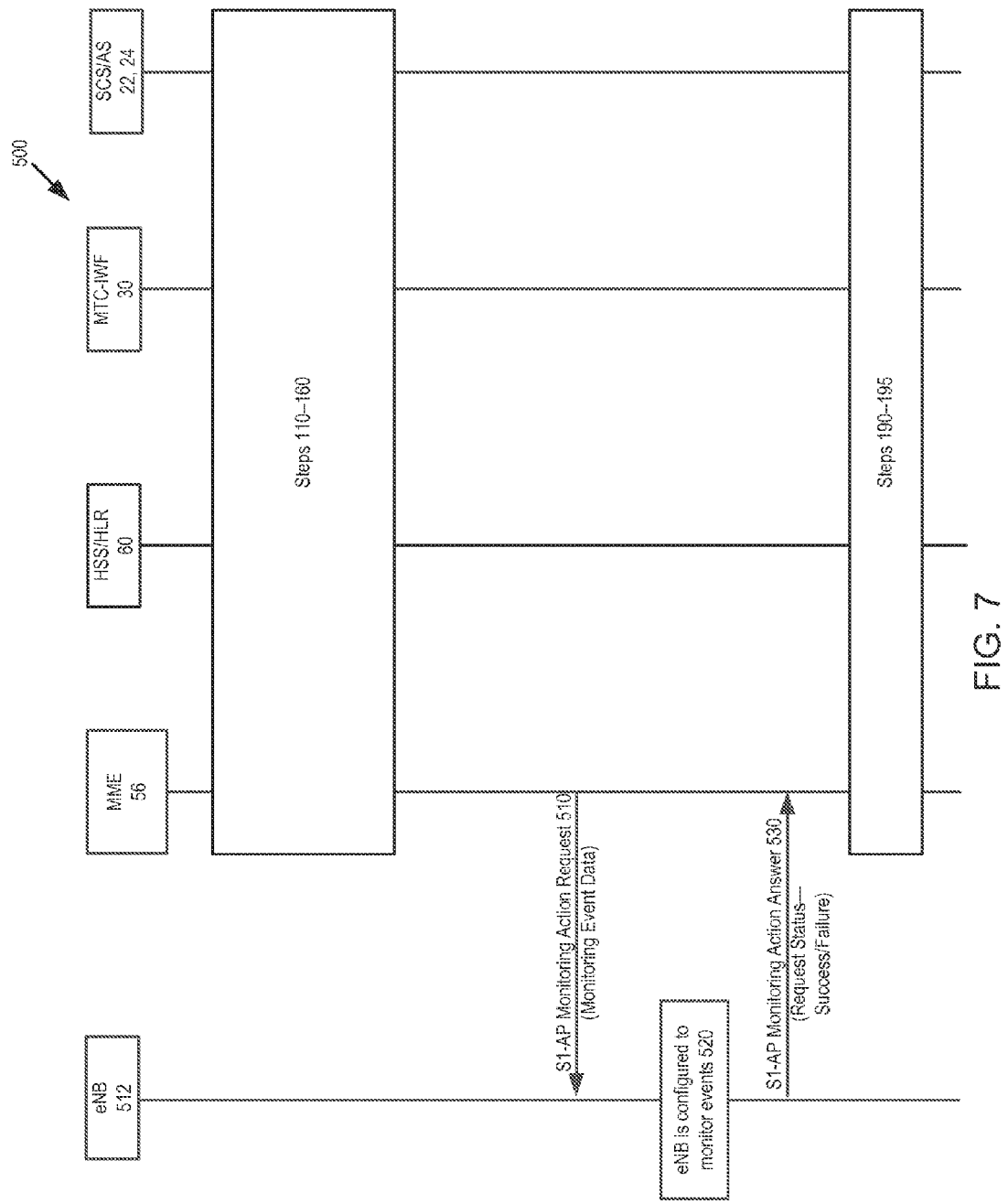
FIG. 7 is a message sequence chart showing message call flow configuring an enhanced node B (eNB) for monitoring.

FIG. 7 shows a message call flow 400 using a S1-application protocol (S1-AP) interface for configuring the eNB 512 (or the GGSN) to monitor events. S1-AP is protocol that runs on S1-MME interface between RAN 88 (which is the eNB 512 in some embodiments) and the MME 56. FIG. 7 shows previously described steps 110-160 and 190-195 that are common to FIGS. 2-3.

Steps 510-530: The MME 56, on receiving the monitoring event configuration request from the MTC IWF 30, forwards it to the eNB 512 via an S1-AP interface (not shown). An S1-AP MAR message has a format similar to the MAR message defined in Table 1. Therefore, monitoring event details and actions are provided to the eNB 512 and it is configured to monitor for defined events. In another embodiment, an existing S1-AP message is enhanced along the lines of the DAR message enhancements to carry monitoring event data to the eNB 512. Likewise, an S1-AP MAA message is defined similar to the MAA message to report the result of configuration at the eNB 512. Thus, existing S1-AP messages can be enhanced to carry reports from the eNB 512. The MME 56, on receiving a report, initiates step 190. Step 195 is then performed by the MTC-IWF 30 as described previously.

B. Detection of Events

Figure 8:
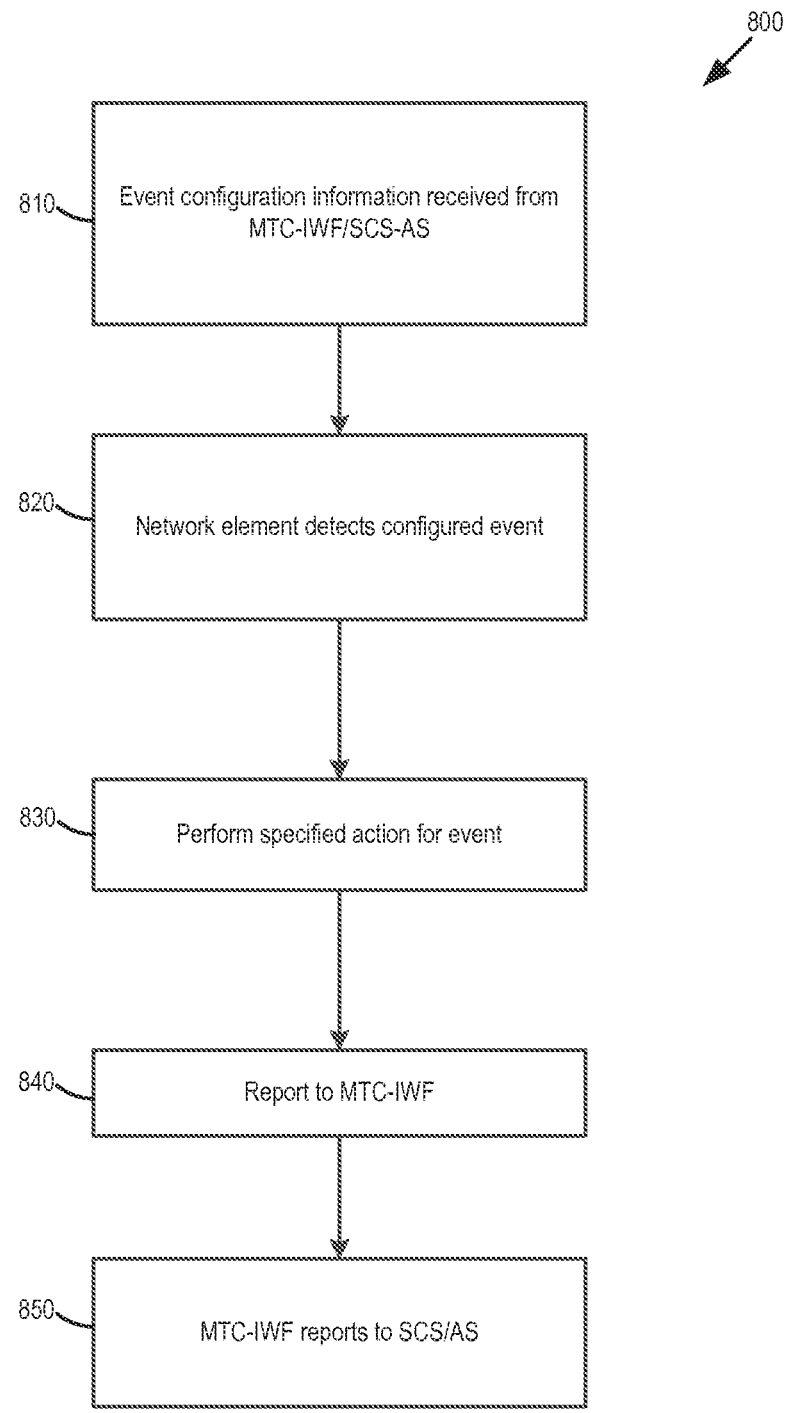
FIG. 8 is a flowchart showing network element behavior in response to a monitoring event.

FIG. 8 is a flow chart showing event configuration, detection, and reporting. As described in Section A, any of the network elements are configured at step 810. The configured monitoring event can be detected 820 by different nodes depending on event type. Depending on the type of monitoring event, an event may be detected by the SGSN/MME 54, 56, the GGSN/P-GW 80, the UE 16, the MME 56, the HSS 60, or other nodes. For example, if monitoring event(s) are detected by the GGSN/P-GW 80, it then delivers the detected monitoring event to the SGSN/MME 54, 56 so that the monitoring event can be reported over T5/Tsp interfaces 38, 32. In some embodiments, a report is sent to the MTC-IWF 30, which sends the report over the Tsp interface 32 to the SCS/AS 22, 24 to inform it of the event. In other words, if the monitoring event is detected by the GGSN/P-GW 80, the GGSN/P-GW 80 reports monitoring event detection to the SGSN/MME 54, 56 to be forwarded to the SCS/AS 22, 24 via the MTC-IWF 30. In other embodiments, the GGSN/P-GW 80 may directly report the event to the SCS/AS 22, 24.

When monitoring events are detected and specific actions are bound with the detected monitoring event, such actions are performed at step 830. In other words, predefined actions corresponding to the event type are performed. For example, the action of "detach the UE 16 from the 3GPP system 10 and report the event" may be performed if the UE 16 changes its location to a restricted area. In this case, the SGSN/MME 54, 56 would detach the UE 16 and report 840 to the MTC-IWF 30 the event. The MTC-IWF 30 would then report 850 to the SCS/AS 22, 24.

C. Reporting Events

C.1 Reporting of Monitoring Events from an SGSN/MME

Event reporting does not necessarily depend upon event detection. For example, a network node may be configured to monitor a sensor value and continuously report the value for recording that information in a log. In this case, information is simply reported (perhaps continuously), without any discrete event detection.

To report a monitoring event, the SGSN/MME 54, 56 (or other reporting node) sends a monitoring event report to the MTC-IWF 30. A default MTC-IWF may be configured in the UE's MTC subscription or an MTC-IWF may be locally configured in the visited network. The SGSN/MME 54, 56 includes in its report information identifying the SCS/AS 22, 24 that subscribes to the monitoring events, provided such information is included in UE's MTC subscription. If the SCS/AS information is not obtained from the SGSN/MME, the MTC-IWF 30 interrogates the HSS 60 to obtain the SCS/AS information. The HSS 60 then returns the SCS/AS information corresponding to the monitoring event type. For example, an external Identifier of the MTC device may be returned. The MTC-IWF 30 then sends the monitoring event report to an appropriate SCS/AS which subscribes the specific monitoring event.

C.2 Reporting of Monitoring Events from a UE

The UE 16 can generate and report the monitoring event. Once the UE 16 has been configured to monitor specific events, and if an event occurs, then the UE 16 sends a report to the MTC-IWF 30 using an uplink small data procedure. This can be done using the T5 interface 38 uplink small data procedure as defined in 3GPP Technical Report 23.887 using generic non-access stratum (NAS) transport. In this case, a small data protocol data unit (PDU) would include monitoring reporting information similar to the information of Table 1.

D. Example UE Embodiment

Figure 9:
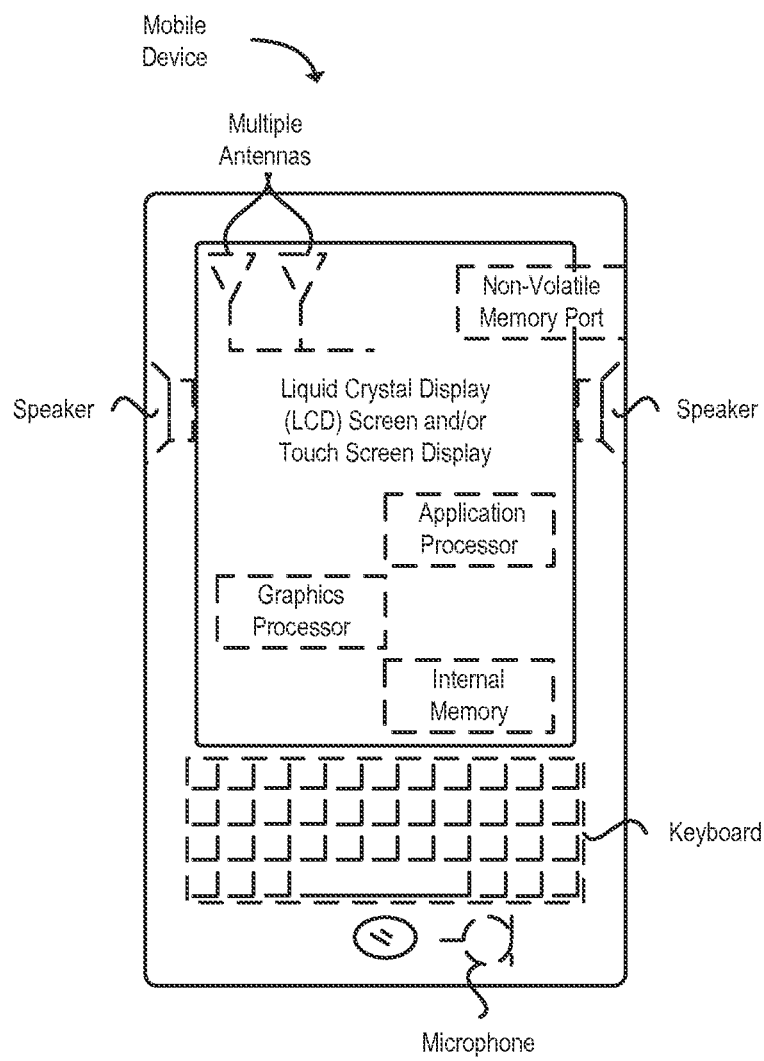
FIG. 9 is a block diagram of a UE, according to one embodiment.

FIG. 9 provides an example illustration of a mobile device, commonly deployed as a UE, and referred to as a mobile station (MS), a mobile wireless device, a mobile communication device, a tablet, a handset, or other type of mobile wireless device. The mobile device can include one or more antennas configured to communicate with transmission station, such as a base station (BS), an eNB, a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors may be configured with instructions stored on a computer-readable storage device.

Although the present disclosure includes reference to specific example embodiments, it will be recognized that the claims are not limited to the embodiments described, but can be practiced with modification and alteration within the spirit and scope of the appended claims. For example, configuration, detection, and reporting, specified in sections above are conducted on the control plane, but monitoring can also be conducted on the management plane. Accordingly, the specification and drawings are to be regarded in an illustrative sense rather than a restrictive sense.

It will be understood by skilled persons that many changes may be made to the details of the above-described embodiments without departing from the underlying principles of the invention. The scope of the present invention should, therefore, be determined only by the following claims.

The invention claimed is:

1. A method performed by a node in a third generation partnership project (3GPP) network, the method comprising:
receiving machine-type communication (MTC) monitoring event data conveyed by an MTC interworking function (MTC-IWF) for a services capability server (SCS) and an application server (AS), the monitoring event data including information to configure the node for a monitoring event and to specify an action to be taken by the node in response to the monitoring event;
configuring the node for reporting the monitoring event; and
generating a report of the monitoring event for the SCS.

2. The method of claim 1, further comprising:
detecting an occurrence of the monitoring event; and
generating the report in response to detecting an occurrence of the monitoring event.

3. The method of claim 1, in which the node comprises a serving general packet radio service (SGSN), a mobility management entity (MME), a gateway general packet radio service support node (GGSN), a packet data network gateway (P-GW), or a user equipment (UE).

4. The method of claim 1, in which the MTC-IWF comprises a default MTC-IWF defined in a monitoring subscription account of a user equipment (UE).

5. The method of claim 1, in which the MTC-IWF comprises a dynamically selectable MTC-IWF available in a 3GPP network visited by a user equipment (UE) configured to monitor the monitoring event.

6. The method of claim 1, in which the monitoring event data includes information that specifies whether the event specified by the monitoring event data is to be monitored continuously or intermittently.

7. A non-transitory computer-readable media having instructions that, when executed by a processor, causes a machine-type communication interworking function (MTC-IWF) in third-generation partnership project (3GPP) network system to:
receive from a services capability server (SCS) a diameter-protocol-based message including attribute value pairs (AVPs) defining monitoring event data including a request to establish, activate, deactivate, or trigger report delivery of a monitoring event on a 3GPP destination node;
send to a home subscriber service (HSS) or home location register (HLR) over an S6m interface, a subscriber-information-request message requesting authorization for configuring the monitoring event on a 3GPP network element corresponding to the 3GPP destination node;
receive from the HSS/HLR a subscriber-information-answer message authorizing the MTC-IWF to configure the monitoring event on the 3GPP network element corresponding to the 3GPP destination node; and
determine, based on the monitoring event data, the 3GPP network element that corresponds to the 3GPP destination node.

8. The non-transitory computer-readable media of claim 7, further comprising instructions to:
determine, in response to reception of the diameter-protocol-based message, whether the SCS is authorized to send monitoring requests, whether the SCS has exceeded its quota of monitoring requests, and whether the SCS has exceeded its rate of submitting monitoring requests; and
send, in response to the determination, a monitoring-action-answer message or a device-action-answer message indicating a status of the request.

9. The non-transitory computer-readable media of claim 7, further comprising instructions to:
send to the 3GPP network element over a third interface, an indication to configure the monitoring event.

* * * * *